Dec. 22, 1942.     J. H. JACOBSEN     2,305,708
EGG COUNTER
Filed Jan. 17, 1942     3 Sheets-Sheet 1

Inventor
JOHN H. JACOBSEN
By Clarence A. O'Brien
and Harvey B. Jacobson
Attorneys

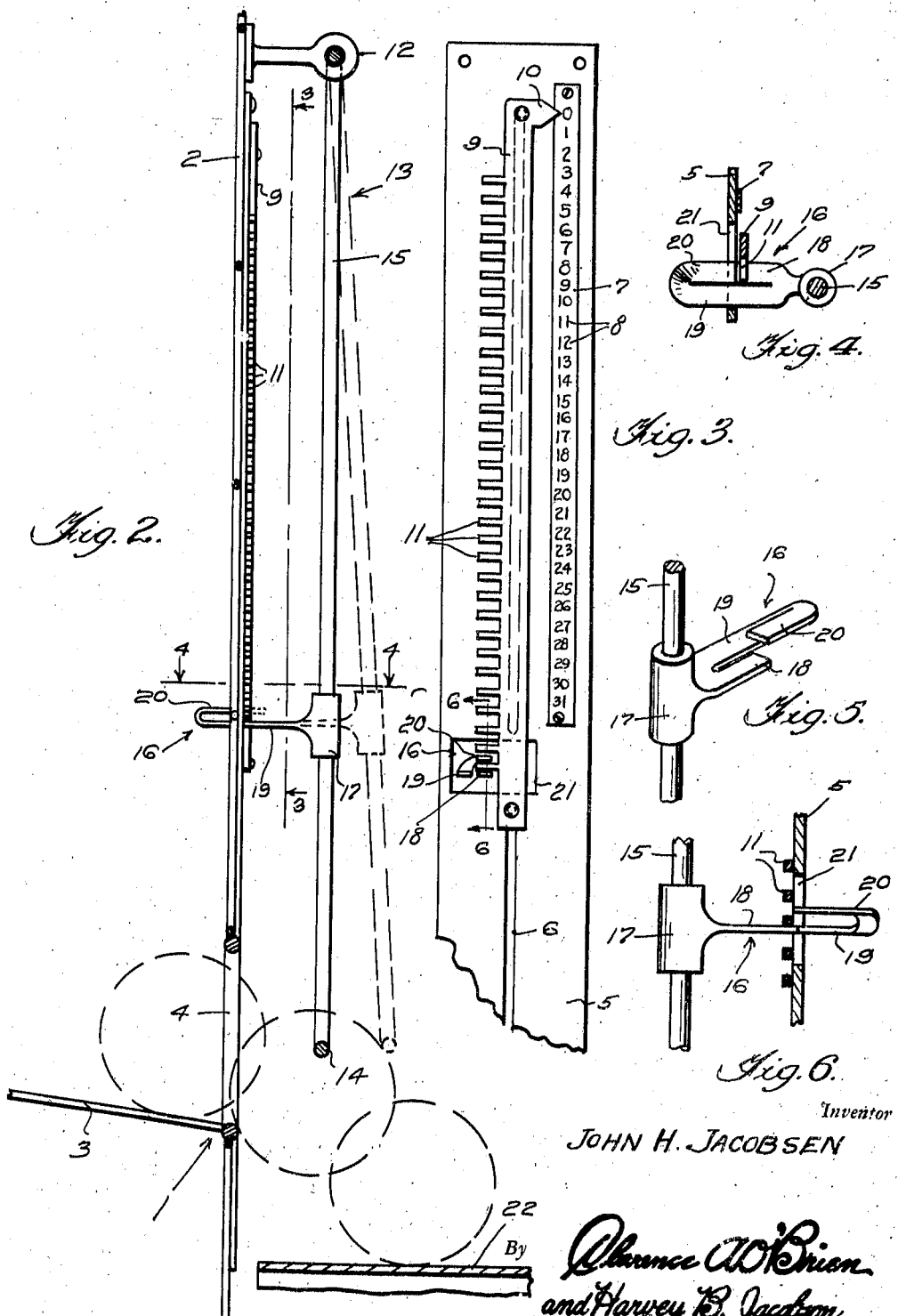

Dec. 22, 1942.   J. H. JACOBSEN   2,305,708
EGG COUNTER
Filed Jan. 17, 1942   3 Sheets-Sheet 3
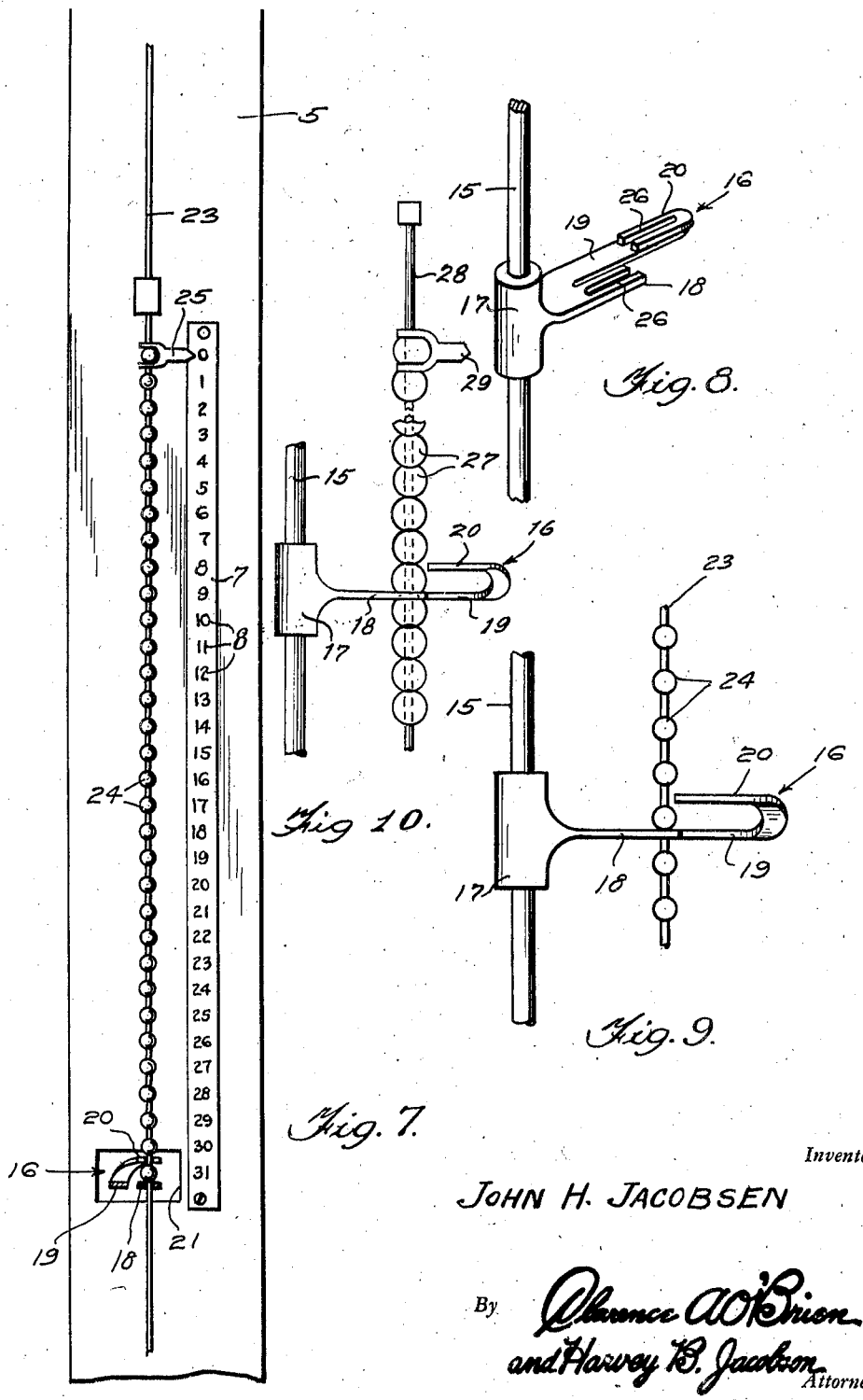
Inventor
JOHN H. JACOBSEN Patented Dec. 22, 1942

2,305,708

UNITED STATES PATENT OFFICE 2,305,708

EGG COUNTER

John H. Jacobsen, San Juan, Puerto Rico

Application January 17, 1942, Serial No. 427,187

5 Claims. (Cl. 235—98)

The present invention relates to new and useful improvements in egg counters, and has for its primary object to provide, in a manner as hereinafter set forth, a device of this character which is adapted to be mounted on laying battery cages, nest boxes, et cetera, for actuation by the eggs as they roll therefrom.

Another very important object of the invention is to provide a counter of the aforementioned character from which it may be readily ascertained how many eggs have been laid in a cage or nest over a given period of time.

Other objects of the invention are to provide an egg counter of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in vertical section through the device.

Figure 3 is a vertical sectional view, taken substantially on the line 3—3 of Figure 2.

Figure 4 is a view in horizontal section, taken substantially on the line 4—4 of Figure 2.

Figure 5 is a perspective view of the dog which controls the indicator.

Figure 6 is a vertical sectional view, taken substantially on the line 6—6 of Figure 3.

Figure 7 is a view in front elevation of a modification, showing the indicator controlling dog in cross-section.

Figure 8 is a perspective view of the indicator controlling dog of the modification of Figure 7.

Figure 9 is a fragmentary view in side elevation of the modification of Figure 7.

Figure 10 is a fragmentary view in side elevation of another modification.

Figure 1:
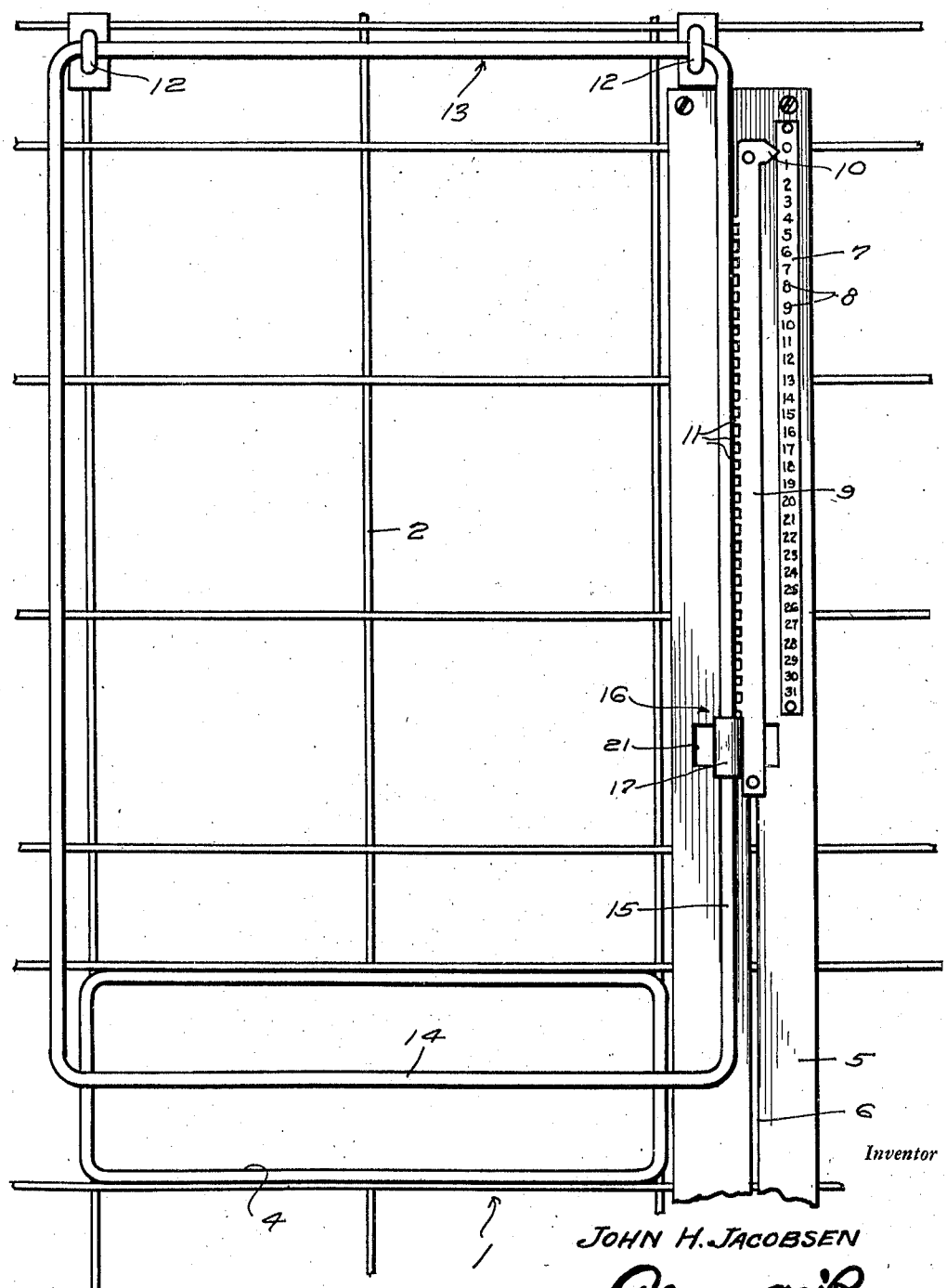
Figure 1 is a view in front elevation of an egg counter constructed in accordance with the present invention.

Referring now to the drawings in detail, it will be seen that reference numeral 1 designates generally a portion of a laying battery cage comprising a front 2. The cage 1 further includes a bottom 3 comprising spaced, parallel wires which are inclined toward the front 2. Extending transversely across the lower portion of the front 2 is a horizontally elongated discharge opening 4 through which the egg rolls by gravity from the inclined bottom 3. The length of the discharge opening 4 corresponds substantially to the width of the laying cage 1.

Mounted vertically on one side portion of the front 2 of the cage 1 is an elongated plate or strip 5 of suitable material. The plate 5 has formed therein vertical slots 6. Mounted vertically on the upper portion of the plate 5, adjacent one side of the uppermost slot 6, is a numbered strip 7, the numerals 8 on said strip, in the embodiment shown, count 31 eggs passing through the opening 4.

Mounted for vertical sliding movement in the slots 6 of the plate 5 is a vertical bar 9. On the upper end portion of the bar 9 is a laterally projecting pointer or indicator 10 for coaction with the numbered strip 7. Projecting in the opposite direction from the bar 9 is a series of spaced teeth 11 which correspond in number to the numerals 8 on the strip 7.

Pivotally moutned at 12 on the upper portion of the front 2 of the cage 1 for swinging movement in a vertical plane is a substantially rectangular frame 13 of suitable wire. The lower bar 14 of the frame 13 extends across the opening 4 for engagement and actuation by eggs rolling therefrom. That is, the frame 13 is swung outwardly by the eggs emerging from the opening 4 and said frame returns by gravity to its normal vertical position.

Mounted on one of the side bars 15 of the frame 13 is a dual dog 16. The dog 16 includes a sleeve 17 which is fixed on the frame member 15. Projecting from the sleeve 17 is a finger 18. Also projecting from the sleeve 17, in spaced parallelism with the finger 18 but of materially greater length, is an arm 19 which terminates in a vertically and laterally offset, reversed finger 20 the free end of which is located substantially above the corresponding end of the finger 18. An opening 21 in the plate 5 accommodates the dog 16. The oppositely positioned fingers 18 and 20 of the dog 16 are engageable with the teeth 11 for permitting the bar 9 to fall intermittently by gravity.

It is thought that the operation of the device will be readily apparent from a consideration of the foregoing. The bar 9 is raised, at the start, to its uppermost position where it is supported by the dog 16, in which position the indicator 10 points to zero on the strip 7. When an egg rolls by gravity through the discharge opening 4 of the laying cage 1, said egg engages the lower bar 14 of the frame 13 and swings said frame outwardly in the manner suggested in dotted lines in Figure 2 of the drawings. In this manner the finger 18 is disengaged from the tooth 11 resting thereon and the bar 9 is permitted to drop, the next tooth coming to rest on the finger 20 which has been moved therebeneath, thereby momentarily arresting the bar 9. When the rolling egg clears the bar 14, the frame 13 swings back toward the cage by gravity to a vertical position. When this occurs the finger 20 is disengaged from the tooth 11 resting thereon, the bar 9 drops again until said tooth engages and comes to rest on the finger 18 which has been moved therebeneath. The indicator 10 has in this manner been lowered to point to the numeral 1 on the strip 7. Of course, the foregoing operation is repeated each time an egg rolls from the cage 1. A suitable runway 22 is provided for receiving the eggs from the cage 1.

In the modification illustrated in Figures 7, 8 and 9 of the drawings, a wire rod 23 is mounted for vertical sliding movement on the plate 5. Fixed on the rod 23 is a series of beads 24 of suitable material. The beads 24 correspond in number to the numerals 8 on the strip 7. Mounted on the uppermost bead 24 is a horizontally projecting indicator 25 for coaction with the strip 7. The fingers 18 and 20 of the dog 16 have extending thereinto from their free ends slots 26 which receive the wire rod 23.

In operation, when the frame 13 is swung outwardly the finger 18 is disengaged from the bead resting thereon and the rod 23 drops until arrested by the next bead coming to rest on the finger 20 which has been brought therebeneath. On the return swing of the frame 13 the finger 20 is disengaged from the bead resting thereon and the rod 23 again drops, being arrested when this bead comes to rest on the lower finger 18 which has been moved therebeneath. In this manner the indicator 25 has been moved downwardly to point to the numeral 1 on the strip 7.

In the modification shown in Figure 10, beads 27 are slidably mounted on a stationary vertical rod 28, the top bead carrying an indicator 29''. With this arrangement the beads only will drop one at a time by gravity past the dog 16 as the device is operated.

It is believed that the many advantages of an egg counter constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

1. An egg counter of the character described comprising a plate, a numbered strip on said plate, a gravity operated member mounted for vertical sliding movement on the plate, an indicator on said member cooperable with the numbered strip, an egg actuated frame pivotally mounted for swinging movement in the vertical plane, and means operatively connecting said frame to the member for alternately releasing and arresting said member for intermittent downward movement thereof.

2. An egg counter of the character described comprising a plate, a numbered strip on said plate, a gravity operated member mounted for vertical sliding movement on the plate, an indicator on said member cooperable with the numbered strip, an egg actuated frame pivotally mounted for swinging movement in the vertical plane, and means operatively connecting said frame to the member for alternately releasing and arresting said member for intermittent downward movement thereof, said means including a series of spaced elements on the member, and a dog on the frame comprising oppositely projecting fingers engageable alternately and successively beneath said elements.

3. An egg counter comprising a vertical plate, a numbered strip mounted vertically on said plate, a bar mounted for vertical sliding movement on the plate, an indicator on said bar cooperable with the numbered strip, a series of spaced teeth projecting from the bar, an egg operated frame pivotally mounted for swinging movement in a vertical plane, and a dog mounted on said frame and engageable alternately and successively with the teeth for releasing the bar for intermittent downward movement upon swinging movement of said frame.

4. An egg counter comprising a plate having a series of numerals thereon, a rod mounted for sliding movement on said plate and operable by gravity in one direction, a series of beads on said rod, an indicator on the rod cooperable with the numerals, a frame pivotally mounted for swinging movement in a vertical plane and operable by an egg, and a dog on said frame and engageable alternately and successively beneath the beads for intermittently releasing the rod.

5. An egg counter comprising a plate having a series of numerals thereon, a rod mounted on said plate, a series of gravity actuated beads slidably mounted on said rod, an indicator on one of said beads cooperable with the numerals, a frame pivotally mounted for swinging movement in a vertical plane and operable by an egg, and a dog on said frame engageable alternately and successively beneath the beads for intermittently releasing said beads.

JOHN H. JACOBSEN.